Nov. 8, 1949     E. F. WEBB     2,487,499
SPIRALLY WOUND STORAGE CELL
Filed Nov. 5, 1947
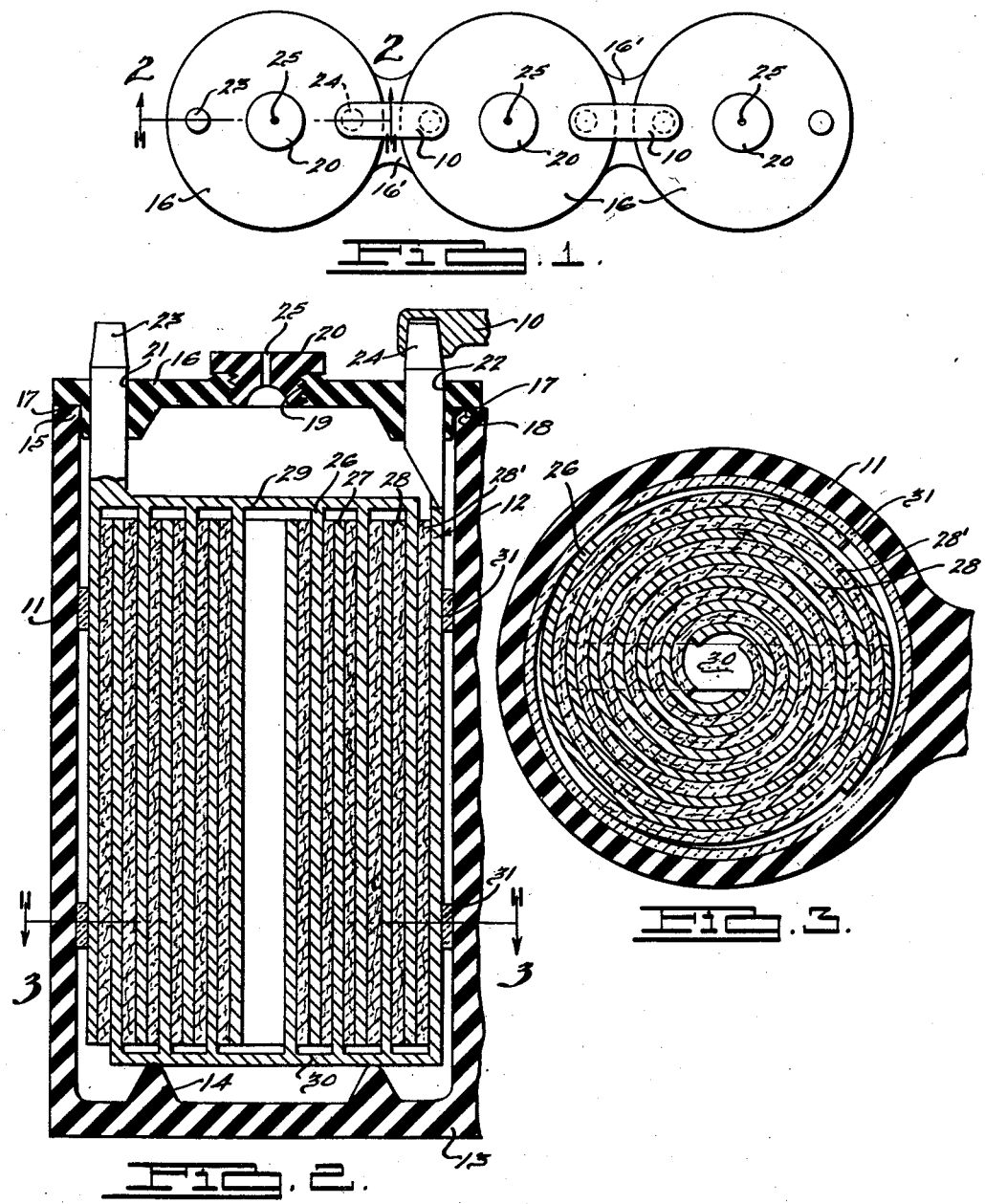
INVENTOR
Edmond F. Webb.
BY
Harness and Harris
ATTORNEYS.

Patented Nov. 8, 1949

2,487,499

UNITED STATES PATENT OFFICE 2,487,499

SPIRALLY WOUND STORAGE CELL

Edmond F. Webb, Franklin Village, Mich., assignor to Chrysler Corporation, Highland Park, Mich., a corporation of Delaware Application November 5, 1947, Serial No. 784,257

1 Claim. (Cl. 136—13)

My invention relates to batteries and more particularly to the wet type storage batteries.

The space available for a storage battery in most mechanisms that require storage batteries is more or less fixed. This is easily seen in the modern motor vehicle where the space allotted to the battery is usually standard. Thus when it becomes necessary to increase battery performance, as for example to increase the current supply to facilitate the cold starting of an internal combustion engine, it can best be done by crowding more plate area into the same volume. This may require thinner plates, thinner separators, and reduction of water space. Factors that limit the use of thin plates in the common flat form are the mechanical strength and resistance to shock as well as conductivity and corrosion.

It is a principal object of my invention to provide a battery cell of the type that employs thin plates thereby increasing the effective surface of the plates as well as the discharge capacity of the cell.

Another object of my invention is to provide a battery cell of cylindrical shape having plates of a spiral construction that will be self-supporting and thereby capable of sustaining great shock and vibration.

Still another object of my invention is to provide a storage battery cell that is very simplified in structure as well as economical to manufacture.

Other objects and advantages will become more apparent from the following description taken in connection with the accompanying drawing in which:

Fig. 1 is a plan view of a storage battery having cells electrically connected in series and embodying my invention.

Fig. 2 is a vertical section view taken on the line 2—2 of Fig. 1.

Fig. 3 is a transverse sectional view taken on the line 3—3 of Fig. 2.

Referring now to Fig. 1, I have shown three wet type storage battery cells of the type embodying my invention electrically connected in series. Connectors 10 provide a suitable connection between the cells so that the voltages of individual cells are numerically added. If desired the casings for these cells may be molded out of one piece of material, such as hard rubber. It should be noted, however, that there should be no fluid communication between the individual cells. The cells are connected by insulators 16'.

In Figs. 2 and 3 is shown a storage battery cell of the type shown in Fig. 1 comprising a cylindrical casing 11 which is adapted to house a storage battery plate unit generally designated by the numeral 12. The casing 11 is provided with a bottom wall 13 which in turn is provided with upstanding ribs 14. The ribs 14 hold the unit 12, which may be inserted through the open end 15 of the casing in spaced relation to the bottom wall 13. A cap 16 for closing the open end 15 of the casing is provided with an annular flange 17 which is adapted to be positioned within an annular groove 18 formed in the end of the side wall of the casing 11. The cap 16 seals the unit 12 within the casing 11. The cap 16 is provided with a threaded aperture 19 for receiving a threaded plug 20 as well as with apertures 21 and 22 which are adapted to receive positive and negative terminals 23, 24, respectively, of the plate unit 12. The plug 20 is of the conventional type for facilitating the filling of the casing 11 with electrolyte and is provided with an outlet 25 which allows the internal gases of the storage cell to escape.

The plate unit 12 comprises a generally concentrically coiled positive and negative plates 26 and 27 respectively, shaped in the form of a spiral with insulating material 28 so positioned therebetween that no portion of either the positive or negative plates will touch the other. The plates 26 and 27 and the insulating material 28 are so positioned in their spiral form to define an opening in the middle thereof to allow the circulation of electrolyte. The positive plate as positioned in its spiral form has one of its edges extending upwardly above the negative plate, as clearly shown in Fig. 2, so that portions of the plate 26 may be connected to a terminal bar 29 which is in turn connected to the positive terminal 23. Similarly, the negative plate 27 has one of its edges extending downwardly beyond the positive plate 26, as clearly shown in Fig. 2, to enable portions of the negative plate to be connected to the elongated terminal bar 30 which is in turn connected to the negative terminal 24. The terminals 23 and 24 and terminal bars 29 and 30 preferably comprise lead and the terminal bars 29 and 30 are fused or otherwise united with their respective terminals and with the plates 26 and 27, respectively. In this manner the bars 29 and 30 not only serve as connections between the plates 26 and 27 and their respective terminals 23 and 24 but also as means for holding the unit 12 in a compact position.

Prior to assembly into the spiral form, the positive and negative plates 26 and 27 are in an elongated state. These plates are of grid-like construction similar to conventional battery plates and are made of material such as lead or other suitable material. They are pasted with active materials such as red oxide of lead. During assembly of these pasted grid-like positive and negative plates 26 and 27, respectively, they are positioned in a face to face relationship with the lengthwise and transverse edges of the plates off-set and a layer of porous insulating material 28 is positioned intermediate the plates 26 and 27. The length wise edges of the plates are off-set so that the portions of the respective plates may be connected to their respective terminals as heretofore mentioned. The transverse edges of the plates are off-set to facilitate a cylindrical form of the unit 12 after the plates have been brought to the spiral form. The plates are also provided with an additional layer of porous insulating material 28' which is adjacent the exterior of one of the plates 26 or 27 so that when the plates are brought to a spiral form, no portion of either plate will touch the other. The plates and layers of porous insulating material are then rolled into a spiral form as more clearly shown in Fig. 3, and thereafter are provided with rings 31 comprising insulating material which not only preserve their spiral shape, but also position the unit 12 in spaced relation to the side wall of the casing 11.

It may be noted that prior to and during assembly of the unit 12 the positive and negative plates 26 and 27 are composed of like material. However, these plates are changed in composition after a forming charge is applied to the cell at which time the positive plate 26 may be coated with lead oxide and the negative plate 27 may be coated with spongy lead if the conventional materials are used in the formation of this cell.

The type of electrolyte used may be of any conventional composition such as a dilute solution of sulphuric acid and water. When electro-motive force is supplied by a battery of this type to a complete electrical circuit so as to produce a flow of current, it is produced by the acid of the electrolyte soaking into and combining with the porous active material of the plates 26 and 27. It should be noted at this point that the ribs 14 of the bottom wall 13 not only position the unit 12 within the casing 11, but also elevate the unit 12 above the end wall 13 so that the sediment dripping from the plates will not short out the battery.

Plate units of the above construction can be employed in cells of batteries of various types including nickel-iron cells.

Although but one specific embodiment of materials is described in the construction of the battery herein disclosed, it can be readily seen that in the broader aspects of my invention, any suitable types of materials may be used.

I claim:

A storage battery cell including a casing comprising insulating material and having a floor provided with an upstanding insulating support element, a generally cylindrical battery plate unit comprising spaced spirally wound elongated positive and negative plates having a plurality of turns and being offset axially relative to each other, edge portions of said positive plate protruding axially in one direction from an end of said unit and edge portions of said negative plate protruding axially in the opposite direction from the other end of said unit, a spirally wound insulator between said positive and negative plates, first terminal means extending across one end of said unit comprising a rigid metal strap fused to said protruding portions of said positive plate, second terminal means extending across the other end of said unit comprising a metal strap fused to said protruding portions of said negative plate, said first and second terminal means rigidifying said battery plate unit by tying together the adjacent convolutions thereof and one of said terminal means being seated upon said upstanding support elements.

EDMOND F. WEBB.

REFERENCES CITED

The following references are of record in the file of this patent:

UNITED STATES PATENTS

| Number | Name | Date |
| --- | --- | --- |
| 2,361,533 | Endress et al. | Oct. 31, 1944 |
| 2,422,046 | Ruben | June 10, 1947 |